(12) United States Patent
Choi

(10) Patent No.: US 7,625,418 B1
(45) Date of Patent: *Dec. 1, 2009

(54) SPACER ARRANGEMENT FOR PLEATED FILTER

(75) Inventor: Kyung-Ju Choi, Louisville, KY (US)

(73) Assignee: AAF-McQuay, Inc., Louisville, KY (US)

( * ) Notice: Subject to any disclaimer, the term of this patent is extended or adjusted under 35 U.S.C. 154(b) by 183 days.

This patent is subject to a terminal disclaimer.

(21) Appl. No.: 11/147,681

(22) Filed: Jun. 8, 2005

(51) Int. Cl.
*B01D 46/00* (2006.01)
*B01D 24/00* (2006.01)
*B01D 39/00* (2006.01)
*A61F 13/15* (2006.01)
*B01D 27/06* (2006.01)

(52) U.S. Cl. .............. 55/521; 55/524; 55/381; 156/204; 210/493.1

(58) Field of Classification Search ........... 55/521, 55/524, 381; 156/204; 210/493.1
See application file for complete search history.

(56) References Cited

U.S. PATENT DOCUMENTS

| | | | |
|---|---|---|---|
| 3,531,920 A * | 10/1970 | Hart | 55/497 |
| 4,154,587 A * | 5/1979 | Gerok | 55/381 |
| 4,268,290 A * | 5/1981 | Barrington | 55/521 |
| 5,028,331 A | 7/1991 | Lippold | |
| 5,053,131 A | 10/1991 | Lippold | |
| 5,064,598 A * | 11/1991 | Seiler | 264/230 |
| 5,066,319 A | 11/1991 | Lippold | |
| 5,071,555 A * | 12/1991 | Enbom | 210/493.5 |
| 5,089,202 A | 2/1992 | Lippold | |
| 5,290,447 A | 3/1994 | Lippold | |
| 5,306,321 A | 4/1994 | Osendorf | |
| 5,427,597 A | 6/1995 | Osendorf | |
| 5,804,014 A * | 9/1998 | Kahler | 156/204 |
| 5,888,262 A | 3/1999 | Kahler | |
| 6,159,318 A | 12/2000 | Choi | |
| 6,165,241 A * | 12/2000 | Choi | 55/521 |
| 6,165,242 A * | 12/2000 | Choi | 55/524 |
| 6,254,653 B1 | 7/2001 | Choi et al. | |
| 6,398,839 B2 | 6/2002 | Choi et al. | |
| 6,685,833 B2 | 2/2004 | Lippold | |
| 7,097,684 B2 * | 8/2006 | Choi | 55/486 |
| 2005/0139544 A1 * | 6/2005 | Choi | 210/493.1 |

FOREIGN PATENT DOCUMENTS

GB    2 150 461    *    7/1985

* cited by examiner

*Primary Examiner*—Walter D Griffin
*Assistant Examiner*—Amber Orlando
(74) *Attorney, Agent, or Firm*—James E. Cole; John F. Salazar; Middleton Reutlinger

(57) ABSTRACT

A pleated fluid filter having a pair of spaced longitudinally extending flanks is formed by at least one layer of a fluid filter media. A spacing member is integral with one of the flanks and extends outwardly in contacting relation with an adjacent flank.

29 Claims, 6 Drawing Sheets

SPACER ARRANGEMENT FOR PLEATED FILTER

BACKGROUND OF THE INVENTION

The present invention relates to fluid filter media and more particularly to a unique and novel arrangement for uniformly forming and spacing opposed pleat flanks of successive pleats of pleated filter media to provide a novel unified pleated filter product which can be produced by the unified inventive method as set forth herein.

As is indicated in the related patent applications, U.S. Ser. No. 10/317,437 and No. 10/748,365, various arrangements are known in the filtration art for forming pleated filter media material and spacing the successive pleats in geometrically configured planar and cylindrical cartridges produced by such forming arrangements. In this regard, attention is directed to some of the prior art noted in the related U.S. patent application Ser. No. 10/317,437, filed on Dec. 12, 2002 by Kyung-Ju Choi. More specifically, attention is directed to the pleat spacer arrangement of U.S. Pat. No. 3,351,920, issued to C. G. Hart on Oct. 6, 1970, and to the spaced incremental spacer arrangement of U.S. Pat. No. 5,071,555, issued to K. Enbom on Dec. 10, 1991, wherein the spacer increments successively align in spaced relation between adjacent pleat flanks to space the same. Further attention is directed to the embossed spacer and dimple arrangements of the respective U.S. Pat. Nos. 5,290,447, issued Mar. 1, 1994, to H. J. Lippold and No. 5,306,321, issued on Apr. 26, 1994, to R. J. Osendorf. Further attention is directed to the cartridge filter configuration of U.S. Pat. No. 5,427,597, issued to R. J. Osendorf on Jun. 27, 1995. Further attention is directed to the several different method arrangements for forming pleated filters as are disclosed in U.S. Pat. Nos. 5,804,014, issued to K. Kahler on Sep. 8, 1998; and to the four patents issued to Kyung-Ju Choi, namely, No. 6,159,318 on Dec. 12, 2000; No. 6,165,242, issued Dec. 26, 2000; No. 6,254,653, issued Jul. 3, 2001; and No. 6,398,839, issued Jun. 4, 2002. Finally, attention is directed to the several incremental pleat spacer arrangements disclosed in U.S. Patents issued to H. J. Lippold, namely: No. 5,028,331, issued on Jul. 2, 1991; No. 5,053,131, issued on Oct. 1, 1991; No. 5,066,319, issued on Nov. 19, 1991; No. 5,098,202, issued Feb. 18, 1992; and to Publ. No. U.S. 2002/003324 A1, published Mar. 21, 2002.

None of these aforedescribed several patents however discloses or even suggests the unified, unique, novel, straightforward, efficient and economical method and apparatus involving pleating and spacing adjacent successive opposed flanks of adjacent pleats to provide uniformly extending selected V-shaped, stable pleat spacing arrangements with selected geometric configurations and with a minimum of parts and a minimum of steps, optimizing stable performance characteristics with reduced pressure drops and even further effectively utilizing and inventively adding to the know-how of prior arrangements including, but not limited to, those set forth in the aforedescribed patents and co-pending patent application.

In accordance with the present invention, a unified, unique and novel filter arrangement including a method and product is provided to allow for efficient and low pressure drop fluid filtration operations—particularly air filtration—and for ready formation of selected planar and/or cylindrical geometric configuration with readily selected stable spacing arrangements between adjacent pleat flanks.

Various other features of the present invention will become obvious to one skilled in the art upon reading the disclosure set forth herein.

BRIEF SUMMARY OF THE INVENTION

More particularly, the present invention provides a pleated fluid filter arrangement comprising: at least one layer of fluid filter media having opposed upstream and downstream filter media faces and being pleated into at least one pair of longitudinally extending adjacent opposed successive pleat flanks of selected depth and spacing between successive pleat flanks to provide spaced upstream and downsteam filter face crests and valleys; the at least one opposed pair of successive opposed pleat flanks along at least one face of the filter media being separated by a pleat spacer member fixed and extending from one of the pair of opposed pleat flanks to the opposite pleat flank of the pair to be joined thereto in fixed flank spacing relationship.

In addition, the present invention provides a unified method of manufacturing such an inventive pleated fluid filter which includes opposed upstream and downstream filter media faces comprising the novel steps of: feeding at least one layer of filter media from a supply zone to an optional scoring zone to provide spaced score lines which serve to form at least one pair of opposed pleat flanks; feeding the scored layer of filter media to a spacer member application or forming zone to selectively form at least one spacer member thereon on at least one of the opposed flanks with the spacer member being of selected sufficient depth to substantially extend to the opposite flank of the opposed flank pair when the filter media is fed to a pleating zone; and, feeding the media with the spacer member formed thereon to form at least one pleat with the spacer formed on one flank being substantially adjacent the other opposed flank upon pleat formation. Optionally, scoring of the filter media may be accomplished in the spacer member forming zone thus eliminating the need for a separate scoring zone. Another alternative embodiment of the present invention has a scoring zone following the spacer member forming zone. Further, the present invention provides a novel method of joining opposed spacer members and flanks and provides a new and useful filter media compound to be employed in the unified inventive product and method.

It is to be understood that several spaced pleats can be formed in accordance with the present invention and that such pleats can be of varying contour and geometric shape in accordance with the fluid stream to be treated and the location thereof.

It also is to be understood that various changes can be made by one skilled in the art in the several steps of the unified inventive method and in the several parts of unified inventive product as described herein without departing from the scope or spirit of the common inventive concept. For example, steps other than as described herein can be employed in the formation of the fluid pervious filter media and in the geometric configuration of the communicately facing spacer members and opposed flanks including the shaping and joining of the adjacent areas of opposed flank pairs, as well as the nature of filter media and adhesive materials employed.

BRIEF DESCRIPTION OF THE DRAWINGS

Referring to the drawings which schematically disclose several embodiments of the unified inventive concept.

DETAILED DESCRIPTION OF THE DRAWINGS

Figure 1:
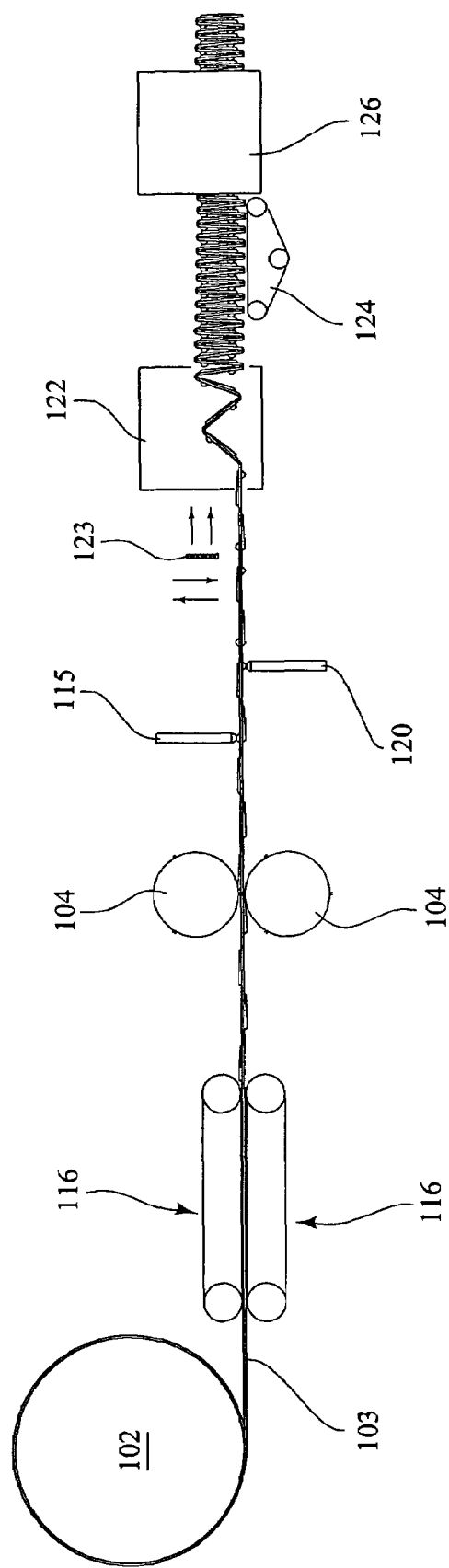
FIG. 1 is a flow diagram schematically disclosing structure which can be utilized in carrying out one or more embodiments of the present invention.

Referring to FIG. 1 of the drawings, a schematic flow diagram illustration of the present invention is set forth. Supply roll 102 of a suitably selected fluid pervious filter media 103 is disclosed. Filter media supply roll 102 can be rotated by a suitably controllable motor (not shown), which feeds from a supply zone the suitable fluid layer of filter media 103 directly to an optional scoring zone 104. Optionally, scoring of the filter media 103 may be accomplished in the spacer member forming zone 116, thus eliminating the need for a separate scoring zone 104. Another alternative embodiment of the present invention (as shown in FIG. 1) has a scoring zone 104 following spacer member forming zone 116.

The fluid layer of filter media 103 can be any one of several types of fluid pervious air filtration media known the air filtration art. There are a variety of known materials used in the production of filter material or media, both synthetic and natural materials. These materials include cellulose, polyolefin, nylon, polyester, and other natural fibers and synthetic compositions. In one such advantageous embodiment of the present invention, the filter media may be synthetic fibrous materials or synthetic materials in conjunction with a cellulose material. In one advantageous embodiment of the present invention, the filter media can be selected to be of a nature such as shown in patent application U.S. Ser. No. 10/317,437, filed Dec. 12, 2002 by Kyung-Ju Choi. These fibrous materials are most often times formed into non-wovens such as wet laid, dri-laid, or polymer-laid forming fiber webs, fibrous mats, or other permeable filtering materials.

Filter media layer 103 may enter optional scoring zone 104 directly or forming zone 116. Shown here, filter media layer 103 enters forming zone 116 which has two opposing belts which form spacers in filter media layer 103 and optionally scores filter media layer 103. If scoring of filter media layer 103 is not accomplished before entering or in forming zone 116 then filter media layer 103 enters scoring zone 104. Scoring zone 104 includes opposed rollers or a scoring mechanism 104, well known in the art, the filter media layer 103 being passed along to a first adhesive application zone 115 and second adhesive application zone 120. From adhesive applicator zones 115 and 120, the formed filter medium 103 is conveyed to pleating zone 122 where pleats (enlarged for illustration) are formed through a suitably powered "back and forth" or vertically "up and down" reciprocating feeding mechanism 123 such as an "up-down" vertically powered screw (schematically shown). The pleated filter media 103 is then passed along endless conveyor belt 124 to a final cutting and assembly zone or station 126. As can be seen in FIG. 1, the filter medium is shown as pleated in a flat pack and suitable portions thereof can be selectively severed and selectively mounted in border frames (not shown).

In optional scoring zone 104 or in forming zone 116, sharp scores are made on any one or any plurality of selected layers of filter media 103. These scores serve for pleating purposes by providing a series of spaced rows of spaced aligned scores which extend laterally or transversely across selected filter media layer 103. The spacing of these rows of lateral, transversely spaced scores is selected to determine the depth of the subsequently formed pleats and, in one embodiment of the invention, the pleats can be of a depth in a range of about 0.5 inch to 12 inches. A pleat depth range of approximately three quarters (¾) inch to 2 inches has been found to be desired; however other depth ranges may be advantageous depending on the environment in which the inventively formed filter media is to be employed.

It also is to be understood that advantageously the formed scores, whether made by optional opposed scoring rollers 104 or spacer former 116, may empirically or by relative estimation be selectively and inventively of very small size to insure that the longitudinally extending upstream crests of subsequently formed pleats are desirably sharp and narrow in breadth so as to afford a minimum of crest resistance to a treated fluid stream. Fluid filter media 103 is pleated into at least one pair of adjacent opposed successive pleat flanks forming crests therebetween. Each of the crests have a breadth. The crests of subsequently formed pleats may desirably be broad and flat or indented to provide strength and support to the pleated filter. In this regard, the peak sharpness or breadth of crest advantageously can be in the range of zero point zero one (0.01) to zero point five (0.5) inches, and advantageously the breadth of the crests can be about 0.25 inches. Yet, depending upon the thickness of combined scrim and filter media layer 103, a desired breadth of crest may be less than zero point zero five (0.05) inches.

Figure 2:
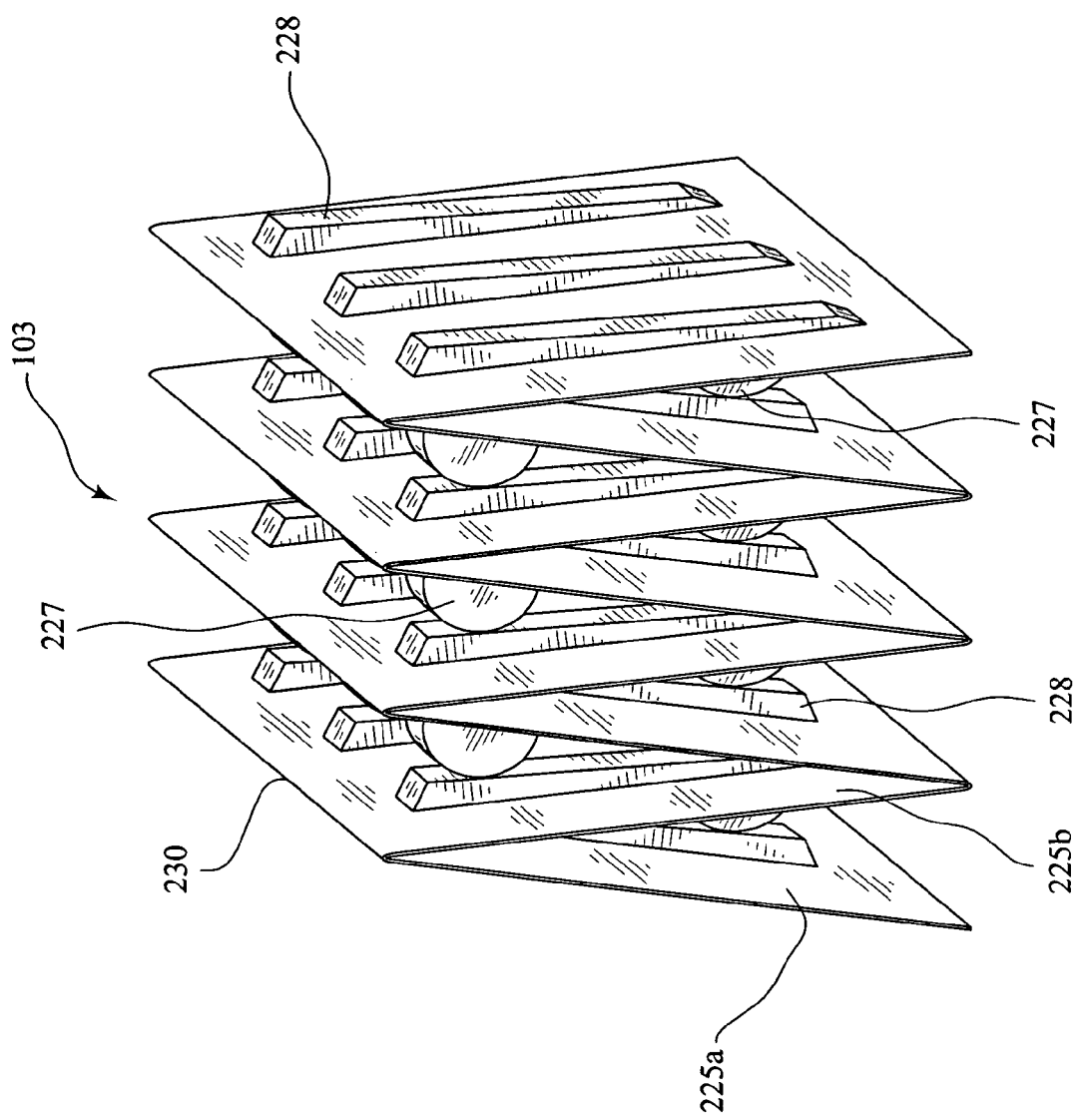
FIG. 2 is an enlarged schematic isometric view of a portion of the novel pleated filter media illustrating pairs of opposed pleat flanks with one flank of each pair having spaced parallel longitudinally extending spacer members of tapered contour embossed thereon and being of sufficient depth to extend adjacent to an adhesive joining treatment—shown in exaggerated form—on the opposing pleat flank.

As shown in FIG. 2, in accordance with a novel feature of the present invention, the thickness or depth of the spacer is so selected that each embossed spacer member 228 is embossed in one flank 225a or 225b of each opposed flank pair 225a, 225b of adjacent flank pairs of scored filter web material 103 and is of a selected depth so that such spacer member 228 on one flank 225a or 225b of a pair extends to a point adjacent the opposite flank of such pair to be held in firm spacing relation in its opposed flank adjacent position upon pleat formation. In this regard, the peak or crest sharpness 230 defined by the joinder of adjacent flanks 225a, 225b in one embodiment of the invention (shown in FIG. 2) is substantially "V-shaped". Advantageously the peak 230 sharpness is in the range of zero point zero one (0.01) to zero point five (0.5) inches, with a pleat depth of 0.5 to 12 inches, and opposed flank spacing in the range of 0.01 to 2 inches.

To hold the spacer member flank 225a, 225b of each pair of opposed flanks in firm, pleat-folded position, advantageously, a suitable joining arrangement of spacer member 228 to opposed flank 225a, 225b is provided. Advantageously, and in accordance with the present invention, this feature of the present invention can be accomplished by means of suitable adhesive coating application 227 to each such opposed flank. Moreover, spacer member 228 may be formed by opposed forming belts 116 by media embossment or displacement in a manner as described hereinafter in FIGS. 4 and 5. To accomplish this companion pressure, adhesive applicators 115 and 120, respectively, are employed. The adhesive coating may be any one of a number of suitable chemical adhesive materials, such as a polyolefin, polyamide, polyester and preferably polyethylenevinylacetate.

With continued reference to FIG. 2 which shows an enlarged portion of pleated filter medium 103, spacer members 228 are shown in geometrically tapered form extending in spaced parallel relation between a crest and valley of the pleated media 103 along opposed media faces. It is to be noted, that each spacer member 228 is positioned on its one flank of an opposed flank pair so as to abut each adhesive coating 227 (enlarged) formed on the opposite flank 225a, 225b of each pleat forming opposed flanks. As aforedescribed, adhesive coatings 227 are pressure applied to such flanks 225a, 225b by companion adhesive pressure applicators 115 and 120 as shown in FIG. 1. In FIG. 2, each of the spaced, parallel spacer members 228 are shown as extending longitudinally between a crest and a valley and geometrically being of tapered configuration with the greater depth adjacent the crest and the lesser depth adjacent the corresponding valley.

In one advantageous embodiment of the present invention, the number of pleats per inch is in the range of 1 to 12 and the pleat depth is in the range of 0.5 to 12 inches. Spaced, parallel spacer members 228 extend longitudinally in the range of 0.5 to 11 inches with the depth closest the crests being in the range of 0.05 to 2 inches and closest the valleys being less than the depth closest the crest. The breadth of each spacer member 228 is generally in the range of 0.01 to 1 inches with spacing between parallel spacer members 228 being in the range of 0.01 to 8 inches.

As aforedescribed, adhesive coating 227 (enlarged for illustration) may be a suitable plastic coating, such as polyolefin, polyamide, polyester, polyethylenevinylacetate, or other adhesive known by a person having ordinary skill in the art. It is to be understood that other joining arrangements in addition to adhesive coating may be utilized and, in one embodiment (not shown), the spacer members 228 are held in firm position by bands or strips of material extending transverse to and fastened to adjacent crests.

Figure 2A:
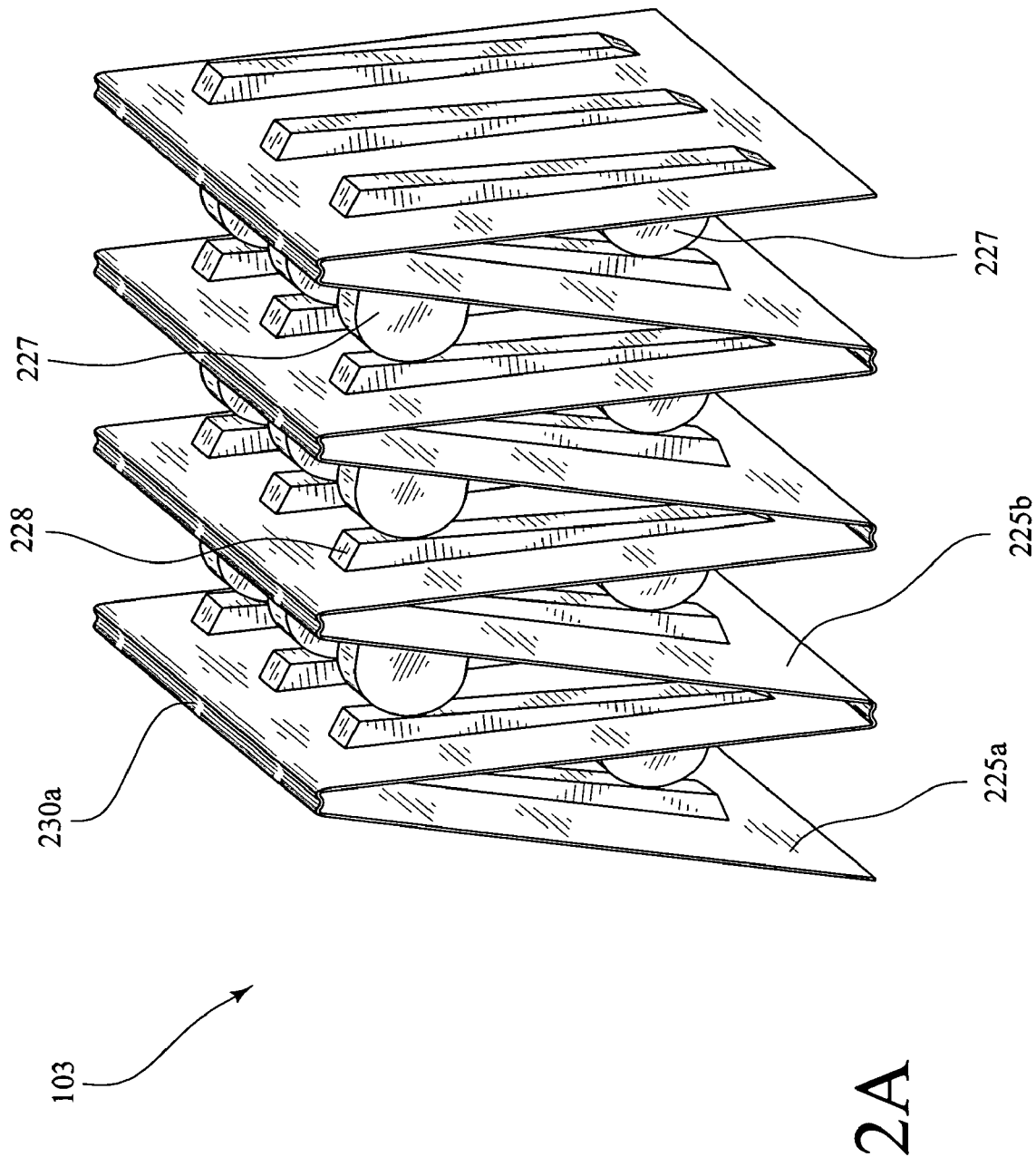
FIG. 2A is a modification of the filter of FIG. 2 showing the filter with a flattened or indented peak at the juncture of adjoining flanks.

In an alternate embodiment of the filter in FIG. 2, FIG. 2a shows a filter media 103 having a peak sharpness or flatness 230a at the pleat or section joining of two flanks 225a, 225b. Generally, the peak sharpness or flatness 230a will be from 0.01 to 0.5 inches in thickness. Peak flatness 230a is broader than peak sharpness 230 and is indented. This broader configuration of peak sharpness or flatness 230a may be incorporated into filter media 103 providing additional strength thereto. Additionally, peak sharpness or flatness 230a may be indented as shown in FIG. 2a providing desired strength and thickness.

Figure 3:
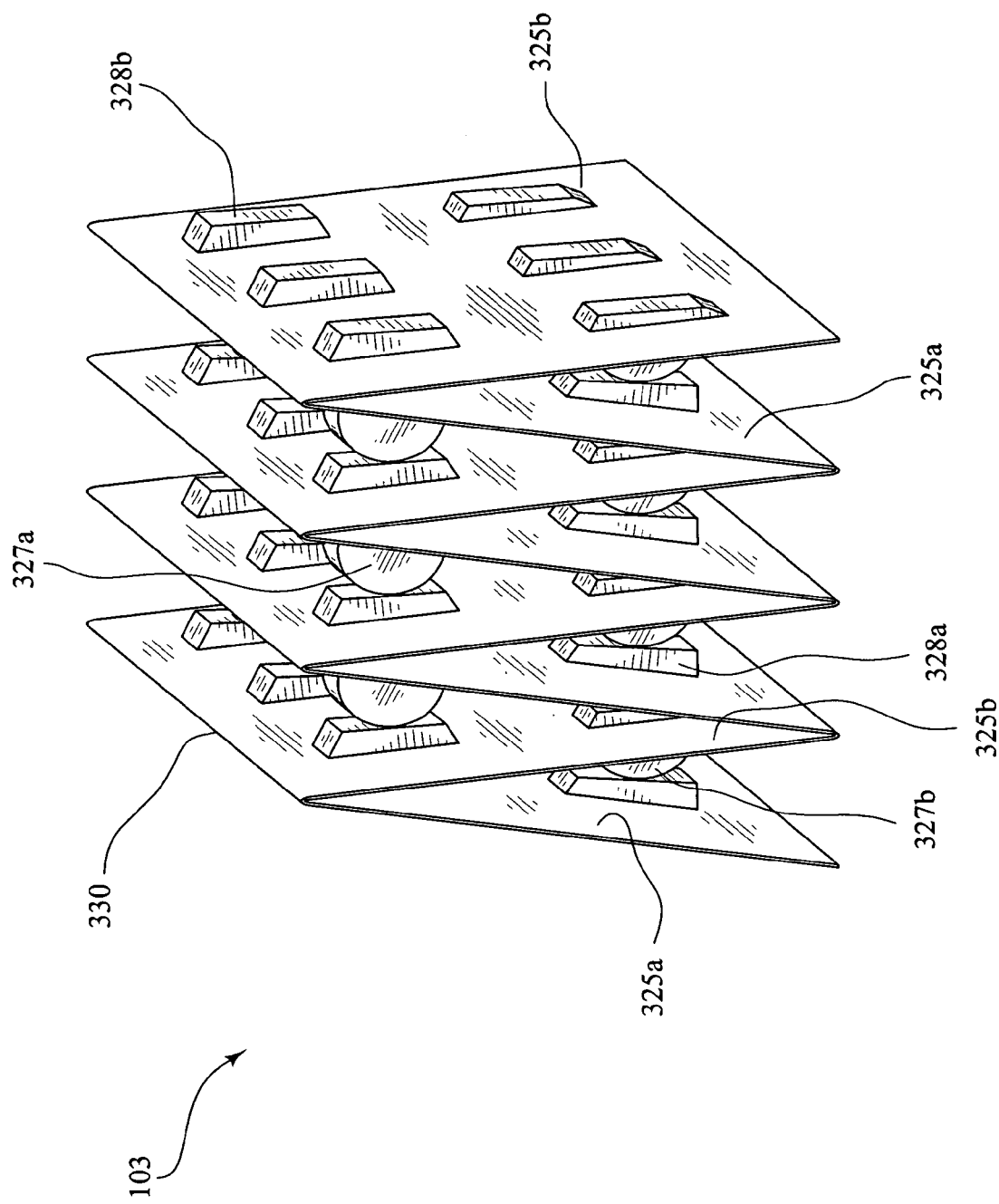
FIG. 3 is an enlarged schematic isometric view of a portion of the novel pleated filter media illustrating pairs of opposed pleat flanks in a further embodiment of the present invention with one flank of each pair having more abbreviated spaced parallel lesser longitudinally extending spacer members of tapered contour embossed thereon with each being of sufficient depth to extend adjacent to an abbreviated adhesive joining treatment—also shown in exaggerated form—on the opposing pleat flank with the opposed flanks of each pair having spaced reciprocal joining arrangements of embossed spacer members and adhesive treatments applied thereto.

Referring to FIG. 3 of the drawings, a further embodiment of the present invention is disclosed wherein longitudinally offset, short spacer members 328a and 328b are provided on pairs of opposed pleat flanks 325a, 325b with offset adhesive coatings 327a and 327b (enlarged for illustration) on opposite flanks of a pair of opposed flanks serving to hold each longitudinally shorter spacer member 328a, 328b in firm, joined position.

Figure 4:
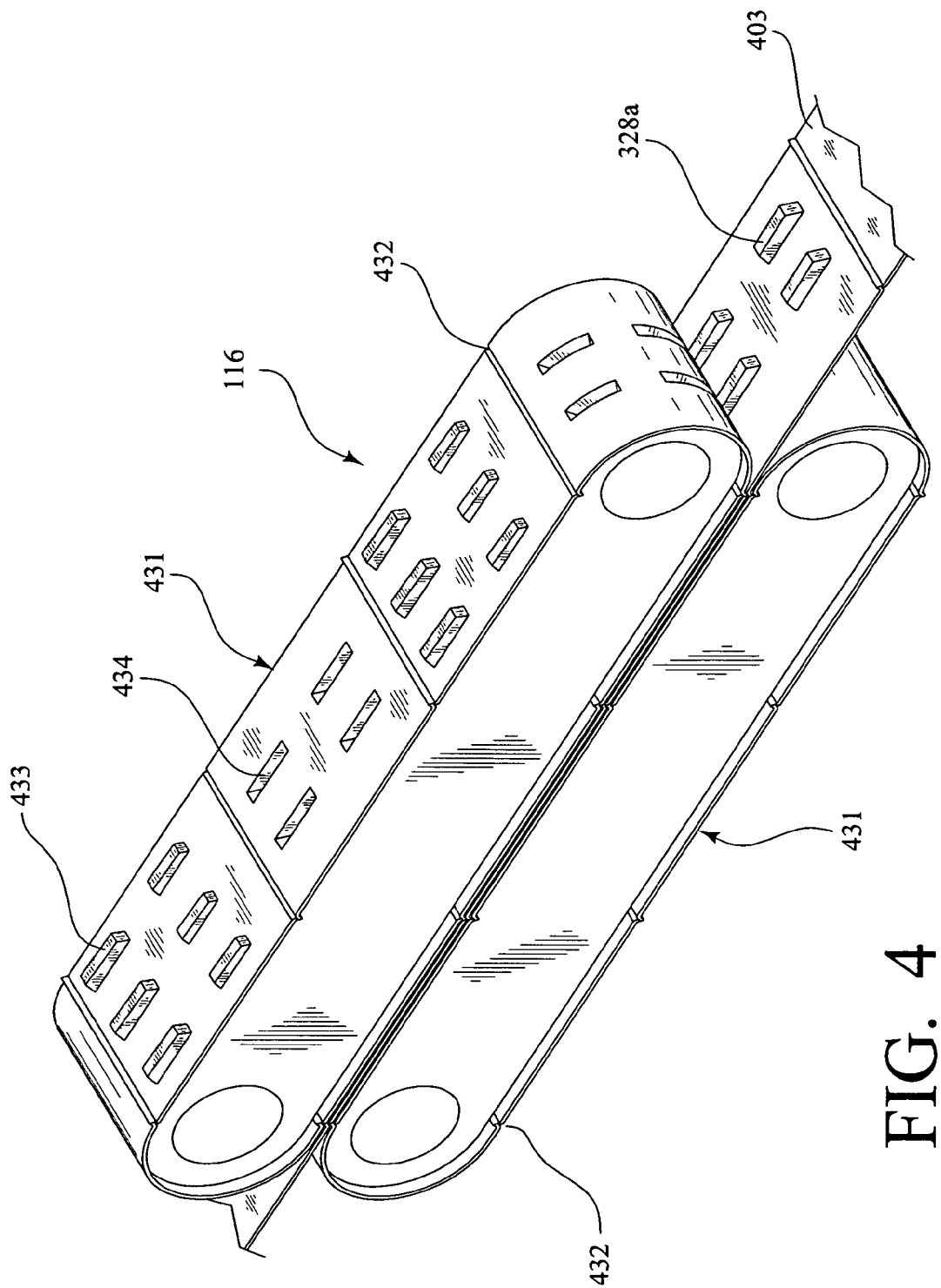
FIG. 4 schematically illustrates a filter layer spacer member former and scorer, disclosing a spacer member and score line former which forms the novel pleated filter media of FIG. 3.

Referring to FIG. 4 of the drawing, wherein opposed endless media embossing, displacement belts, or spacer member formers 431 are shown, an embodiment of spacer formers 116 of the present invention is shown for forming media spacer members 328a and 328b to the media strip 103 (as shown in FIG. 3). Here, opposed endless belts 431 (drives by suitable motor and gearing—not shown) are each provided with spaced scoring blades 432 which serve to provide folding lines in media strip 103 for adjacent opposed pairs of pleat flanks similar to the scoring pleating arrangements of FIGS. 1-3. These scoring blades 432 are optional since scoring can be accomplished with optional opposed scoring rollers 104, before filter media 103 encounters formers 116 (FIG. 1) or 431 or after. Scoring blades 432 form a peak sharpness 230 as shown in FIG. 2, or 230a, having an indentation, as shown in FIG. 2a.

In this FIG. 4, still another spacer arrangement is disclosed as can be seen by the spaced parallel rows of material displacement or embossing members 433 are positioned on one of the to be formed opposed pairs of pleat flanks and the intermediate row of spaced material displacement or embossing members 434 is positioned on the other to be formed opposed pleat flanks. It is to be understood that the depth of spacer members 433 and 434, like those of FIGS. 1-3, is sufficient to extend one of each pair of opposed pleat forming flanks to the other and that the spacer members 433 and 434 can be held in firm position by suitable similar adhesives or other alternative fastening arrangements as above described.

Figure 5:
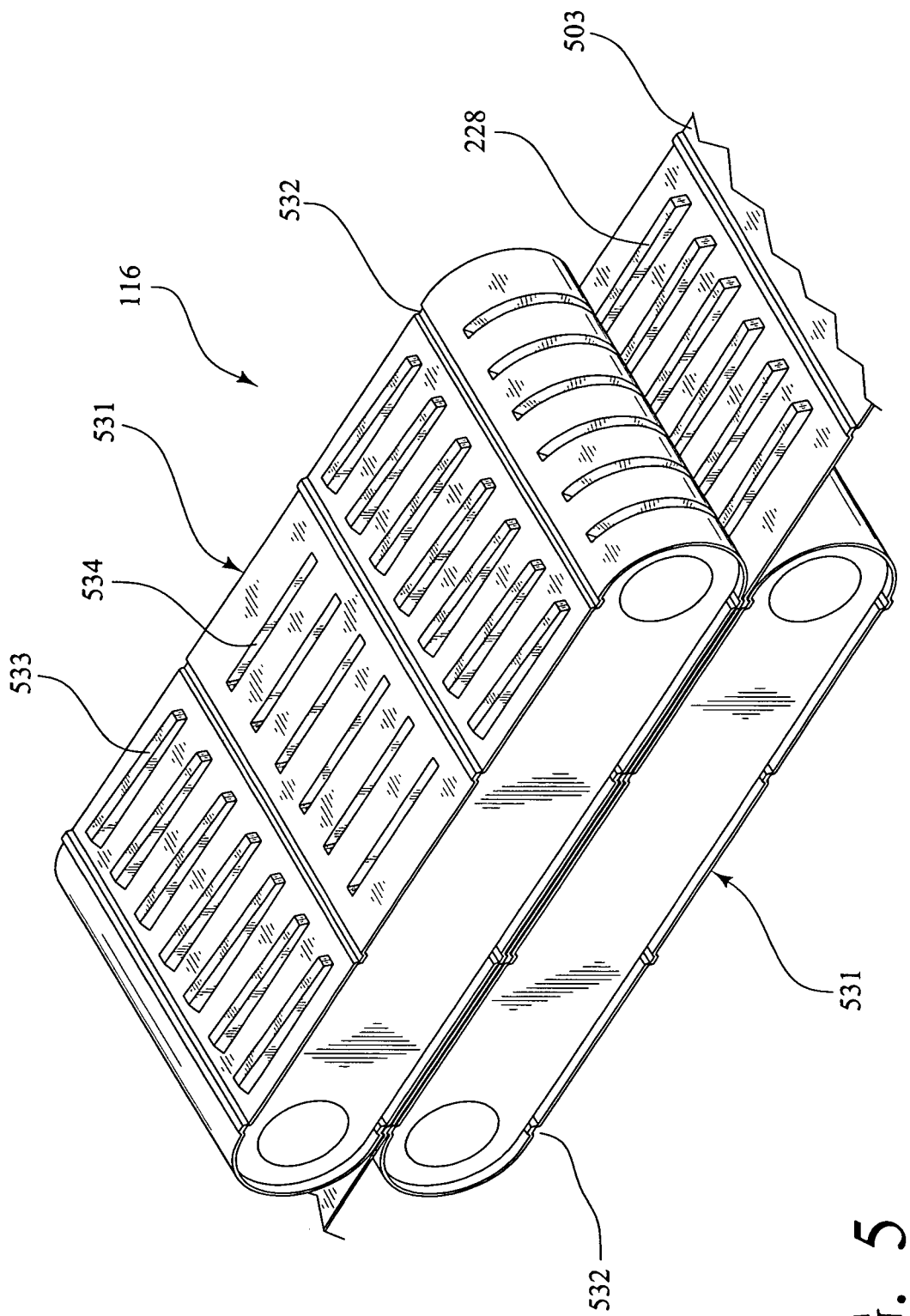
FIG. 5 schematically illustrates an apparatus used in a filter layer forming and scoring step, disclosing a spacer member and score line former which forms the novel pleated filter media of FIG. 2A.

Referring to FIG. 5 of the drawing, wherein opposed endless media embossing, displacement belts, or opposing spacer member formers 531 can be seen, an embodiment of spacer formers 116 of the present invention. Shown here is an embodiment of spacer forming members 531 which forming media spacer members 228 in the media strip 103 (as shown in FIGS. 2 and 2a). Here, opposed endless belts 531 are each provided with spaced scoring blades 532 which serve to provide folding lines for adjacent opposed pairs of pleat flanks similar to the scoring pleating arrangements of FIGS. 1-3. These scoring blades 532 are optional since scoring can be accomplished with optional opposed scoring rollers 104. Scoring blades 532 form a peak sharpness similar to 230a as shown in FIG. 2a. Spaced parallel rows of material displacement or embossing members 533 are positioned on one of the to be formed opposed pairs of pleat flanks and the intermediate row of spaced material displacement or embossing members 534 is positioned on the other to be formed opposed pleat flanks. The depth of spacer members 533 and 534, like those of FIGS. 1-3, is sufficient to extend one of each pair of opposed pleat forming flanks to the other and that the spacer members formed by embossing members 533 and 534 can be held in firm position by suitable similar adhesives or other alternative fastening arrangements as above described.

From the above it again can be seen that an inventive filter arrangement can be provided to include at least one layer of filter media having opposed upstream and downstream faces pleated into at least one pair of longitudinally extending adjacent opposed successive pleat flanks of selected depth and spacing between successive pleat flanks to provide spaced upstream and downstream filter face crests and valleys with the pleats being separated by embossed spacer member means from one of the opposed pair of flanks to the other to be firmly held in place.

A unified novel method of forming such a pleat arrangement also is disclosed wherein filter media is fed from a supply zone to an optional score zone to provide score lines for opposed pleat flanks and then to a spacer forming zone with each spacer member being of selected sufficient depth to extend from one flank to the other of each pair of opposed pleat flanks and finally to a pleating zone.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A pleated fluid filter arrangement comprising:
   at least one layer of fluid filter media having opposed upstream and downstream filter media faces and being pleated into at least one pair of longitudinally extending adjacent opposed successive pleat flanks of selected depth and spacing between successive pleat flanks to provide spaced upstream and downstream filter face crests and valleys; and,
   said at least one opposed pair of successive opposed pleat flanks along at least one face of said filter media being separated by an embossed spacer member unitary with and extending from a planar portion of one of said pair of opposed flanks to a planar portion of the opposite flank of said pair to be firmly held thereto in firm flank spacing relationship each of said pleat flanks having said embossed spacer members from one surface of said pleat flanks and defining cavities on an opposite surface of said pleat planks, said embossed spacer members all extending in a first direction and said cavities all facing in a second direction opposite the first direction;
   said embossed spacer members of one pleat flank of said pair of opposed pleat flanks being offset in a direction substantially transverse to a longitudinal direction from said cavities of the other pleat flank of said pair of opposed pleat flanks so that an adhesive material disposed on an outermost surface of said embossed spacer member of said one pleat flank engages a planar portion of the other of said pleat flank of said pair of opposed pleat flanks.

2. The pleated filter arrangement of claim 1, said spacer member being a displaced media portion of one of said pair of opposed successive pleat flanks.

3. The pleated filter arrangement of claim 1, said spacer member being joined to a planar portion of the opposite flank of said pair by an adhesive.

4. The pleated filter arrangement of claim 1, said spacer member being positioned on an upstream filter media face of one of said flanks.

5. The pleated filter arrangement of claim 1, said spacer member being positioned on a downstream filter media face of one of said flanks.

6. The pleated filter arrangement of claim 1, said spacer member being of selectively narrow breadth and spacing depth to extend a selected distance between a crest and corresponding valley of said opposed pair of successive opposed pleat flanks.

7. The pleated filter arrangement of claim 6, said spacer member being of uniform spacing depth.

8. The pleated filter arrangement of claim 6, said spacer member being of tapering spacing depth between said crest and corresponding valley to provide a tapered fluid stream flow area between said pair of opposed flanks.

9. The pleated filter arrangement of claim 8, wherein said filter media is pleated into a plurality of opposed flank pairs with each of said opposed pleat flanks being separated by a plurality of spaced longitudinally extending spacer members, each being fixed to and extending between each of said crests and corresponding valleys along one of said opposed flanks to extend to an opposite flank to be joined thereto in fixed flank spacing relationship.

10. The pleated filter arrangement of claim 9, said spacer members being of selected breadth and depth to control and enhance a selected velocity through said pleated filter media.

11. The pleated filter arrangement of claim 9, said plurality of spacer members comprising two spaced pairs of spaced spacer increments for each of said opposed flanks and one spacer increment selectively positioned therebetween, said spacer increments being selectively fixed and joined between said opposed flanks of each flank pair.

12. The pleated filter arrangement of claim 1, said pleat defining a peak at the joinder of said pair of flanks, said peaks being substantially V-shaped.

13. The pleated filter arrangement of claim 1, said pleat defining a peak at the joinder of said pair of flanks, said peak being flattened.

14. The pleated filter arrangement of claim 1, said pleat defining a peak at the joinder of said pair of flanks, said peak having a sharpness of from 0.01 to 0.5 inches.

15. The pleated filter arrangement of claim 1, said pleat defining a peak at the joinder of said pair of flanks, said pleat depth being from 0.5 to 12.0 inches.

16. A pleated filter arrangement comprising:
   at least one layer of a fluid filter media having a pleat forming a pair of spaced longitudinally extending flanks, each of said flanks having an upstream face and an opposed downstream face;
   a plurality of embossed spacing members unitary with one of said flanks extending outwardly from one of said faces of said flank and defining a plurality of cavities in the other of said faces of said flank, said plurality of embossed spacers all facing a first direction and said cavities all facing in a second opposite direction, said plurality of spacing members of one flank offset in a direction substantially transverse to the longitudinal direction from said plurality of cavities of an opposed face of an adjacent flank so that said spacing member is in contacting relation with a planar portion of said opposed face of said adjacent flank thereby defining a preselected space between adjacent flanks; and,
   an adhesive disposed between a surface of said embossed spacing member facing said opposed face of said adjacent flank and said opposed face of said adjacent flank.

17. The pleated filter arrangement of claim 16, said spacer member being joined to the opposite flank of said pair by an adhesive.

18. The pleated filter arrangement of claim 16, said spacer member being positioned on an upstream filter media face of one of said flanks.

19. The pleated filter arrangement of claim 16, said spacer member being positioned on a downstream filter media face of one of said flanks.

20. The pleated filter arrangement of claim 16, said spacer member being of selectively narrow breadth and spacing depth to extend a selected distance between a crest and corresponding valley of said opposed pair of successive opposed pleat flanks.

21. The pleated filter arrangement of claim 20, said spacer member being of uniform spacing depth.

22. The pleated filter arrangement of claim 20, said spacer member being of tapering spacing depth between said crest and corresponding valley to provide a tapered fluid stream flow area between said pair of opposed flanks.

23. The pleated filter arrangement of claim 22, wherein said filter media is pleated into a plurality of opposed flank pairs with each of said opposed pleat flanks being separated by a plurality of spaced longitudinally extending spacer members, each being fixed to and extending between each of said crests and corresponding valleys along one of said opposed flanks to extend to an opposite flank to be joined thereto in fixed flank spacing relationship.

24. The pleated filter arrangement of claim 23, said spacer members being of selected breadth and depth to control and enhance a selected velocity through said pleated filter media.

25. The pleated filter arrangement of claim 23, said plurality of spacer members comprising two spaced pairs of spaced spacer increments for each of said opposed flanks and one spacer increment selectively positioned therebetween, said spacer increments being selectively fixed and joined between said opposed flanks of each flank pair.

26. A method of manufacturing a pleated fluid filter including opposed upstream and downstream filter media faces comprising:

- feeding at least one layer of filter media from a supply zone to a scoring zone to provide spaced score lines which serve to form at least one pair of opposed pleat flanks;
- feeding said scored layer of filter media to a spacer member application zone to selectively form at least one outwardly extending embossed spacer member and a cavity defined by said at least one embossed spacer member in an opposite face of said pleat flank having said at least one embossed spacer member therein, said cavity of one flank of said pair of opposed flanks being offset from a cavity of the other flanks of said pair of opposed flanks so that at least one of said pair of opposed flanks with the embossed spacer members being of selected sufficient depth to substantially extend to a planar portion of the opposite flank of said opposed flank pair when said filter media is fed to a pleating zone; and
- feeding said filter media with said embossed spacer members formed thereon to a pleating zone to form at least one pleat with an embossed spacer member of said one flank being substantially adjacent the other of said opposed flank pair upon pleat formation wherein all of said at least one embossed spacer members extend in a first direction and all of said cavities face a second, substantially opposite direction.

27. The pleated filter method of claim 26, further including joining said spacer member to said adjacent flank of said flank pair.

28. The pleated filter method of claim 27 wherein said joining is accomplished with an adhesive material.

29. The pleated filter method of claim 26 wherein a plurality of pairs of opposed pleat flanks are formed by media displacement with a spacer member displacement formed on at least one of each opposed pleat flank of a depth to extend adjacent the other flank of the pair.

* * * * *